United States Patent [19]

Andrén

[11] 4,156,642

[45] May 29, 1979

[54] PROCESS IN THE CLEANING OF SEED, GRAIN AND SIMILAR GOODS, AND A CLEANING MACHINE FOR CARRYING OUT THE PROCESS

[75] Inventor: Ingmar Andrén, Lindesberg, Sweden

[73] Assignee: AB Linde Maskiner, Lindesberg, Sweden

[21] Appl. No.: 777,744

[22] Filed: Mar. 14, 1977

[30] Foreign Application Priority Data

Mar. 24, 1976 [SE] Sweden .............................. 7603584

[51] Int. Cl.² .............................................. B07B 4/02
[52] U.S. Cl. ..................................... 209/10; 209/37; 209/139 R; 209/154
[58] Field of Search ................................... 209/30–37, 209/143, 133–139, 154, 10

[56] References Cited

U.S. PATENT DOCUMENTS

| | | | |
|---|---|---|---|
| 1,597,261 | 8/1926 | Bishop | 209/139 R |
| 2,899,139 | 8/1959 | Hardinge | 209/138 |
| 2,968,399 | 1/1961 | Andren | 209/133 |
| 3,572,503 | 3/1971 | Hezel | 209/135 |

FOREIGN PATENT DOCUMENTS 192792  3/1964  Sweden.

*Primary Examiner*—Frank W. Lutter
*Assistant Examiner*—Jon E. Hokanson
*Attorney, Agent, or Firm*—Karl W. Flocks

[57] ABSTRACT

The disclosure relates to a process and a cleaning machine for seed, grain and similar goods, in which the cleaning is realized by means of air circulated in an enclosed path by at least one fan, the air passing the grain adjacent the discharge opening of the machine for the air-cleaned grain. In the machine the resistance to the air circulating in the enclosed path is adjusted such that the static O-point will be located in the vicinity of the discharge opening for the air-cleaned grain. Furthermore, for the purposes of the above-disclosed process, the fan cooperates with a duct for the cleaning air moving to the fan, and with a duct for the air recycled to the cleaning station at the discharge opening, the ducts being of roughly the same length.

7 Claims, 2 Drawing Figures

PROCESS IN THE CLEANING OF SEED, GRAIN AND SIMILAR GOODS, AND A CLEANING MACHINE FOR CARRYING OUT THE PROCESS

The present invention relates to a process in cleaning machines for seed, grain and the like, of the type in which the cleaning is achieved by means of air which is circulated in an enclosed path by at least one fan or the like, the air passing the grain adjacent the discharge opening of the machine for the air-cleaned grain.

The invention also relates to a machine in which the cleaning is realized by means of air circulated in an enclosed path by at least one fan or the like, the air passing the grain adjacent the discharge opening of the machine for the air-cleaned grain, the resistance to the air circulating in the enclosed path being adjusted such that the static O-point will be located in the vicinity of the discharge opening for the air-cleaned grain.

According to the invention, the resistance to the air circulating in the enclosed path is adjusted such that the static O-point will be located in the vicinity of the discharge opening for the air-cleaned grain. Hereby, the amount of air which will constantly pass the discharge opening or openings will be reduced to a minimum. Moreover, dust formation problems are eliminated.

The static O-point in a circulation system provided with fans is that point at which the static pressure increase on the pressure side of the fan undergoes a transition to a pressure decrease which becomes more and more pronounced up to the fan on its suction side. In an open circulation system the O-point always corresponds to the atmospheric pressure. The position of the O-point is not predetermined, but can be adjusted with the help of the duct resistance and resistance at the inlet and discharge points. Thus, it is this possibility of adjusting the O-point which is utilized according to the present invention.

For achieving the contemplated result, the fan cooperates with a duct for cleaning air which flows to the fan and with a duct for the air recycled to the cleaning station at the discharge opening. Both of these ducts have substantially the same resistance. According to another embodiment of the present invention, the enclosed path for the circulating air moved by the fan can be provided, at a suitable point, with resistor means for the air.

According to an essential characteristic of the present invention, the fan of the cleaning machine consists of a centrifugal fan provided with a diffusor, the fan, at the periphery of the diffusor, being provided with a slot for screening off a minor portion of the air emanating from the fan. The screened-off air passes through some form of filter, whereby the concentration of fine dust is kept at a low level in that portion of the air which circulates in the enclosed path. The air emanating from the filter can be released directly into the room where the cleaning machine stands, since the air can, without risk, be sucked into the machine again. Moreover, the heating the ambient air, when desired, takes place.

The present invention and its aspects will be more readily understood from the following description of the drawings, and discussion relating thereto.

Figure 1:
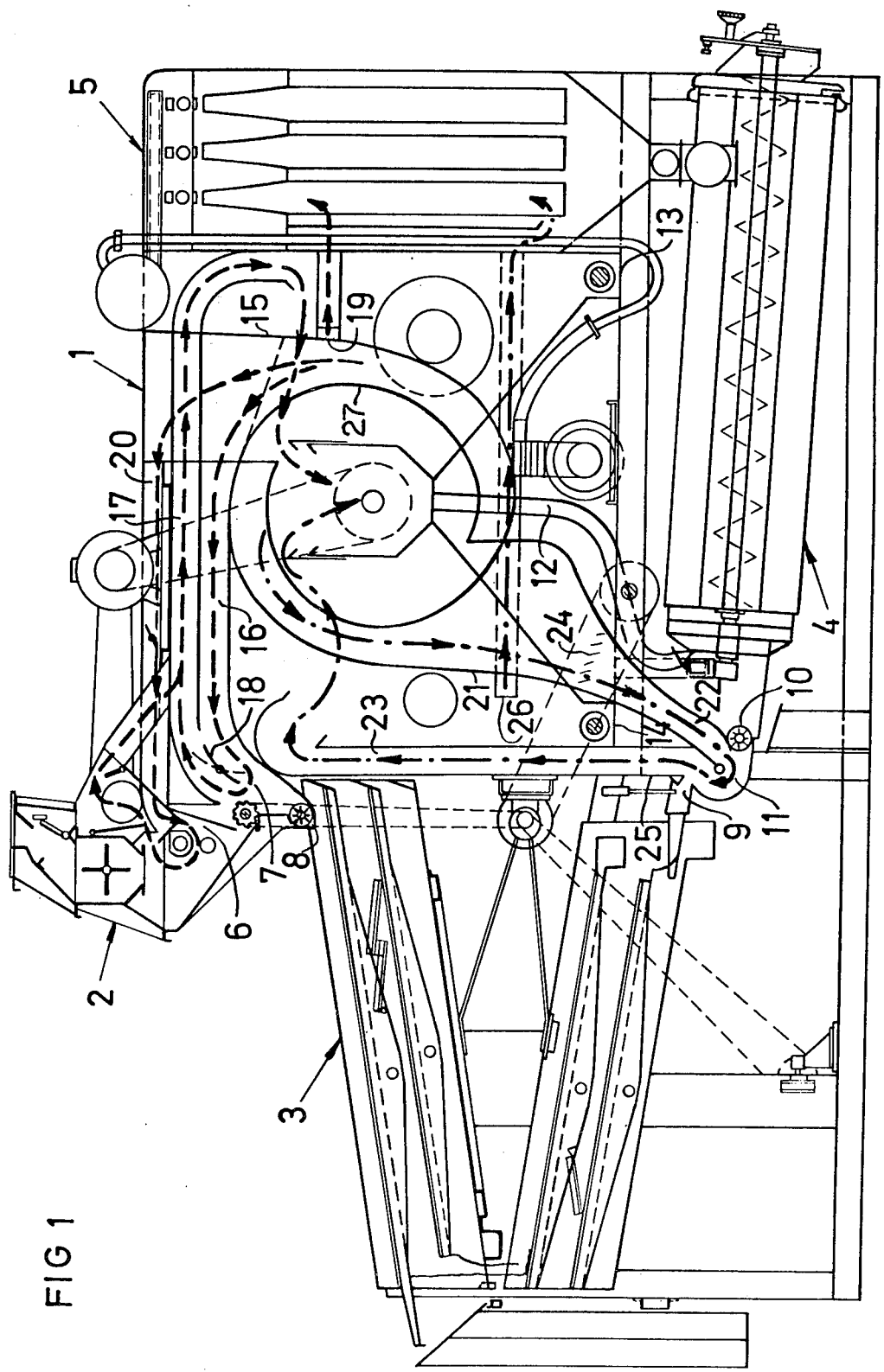
FIG. 1 is a vertical longitudinal section of the cleaning machine.
Figure 2:
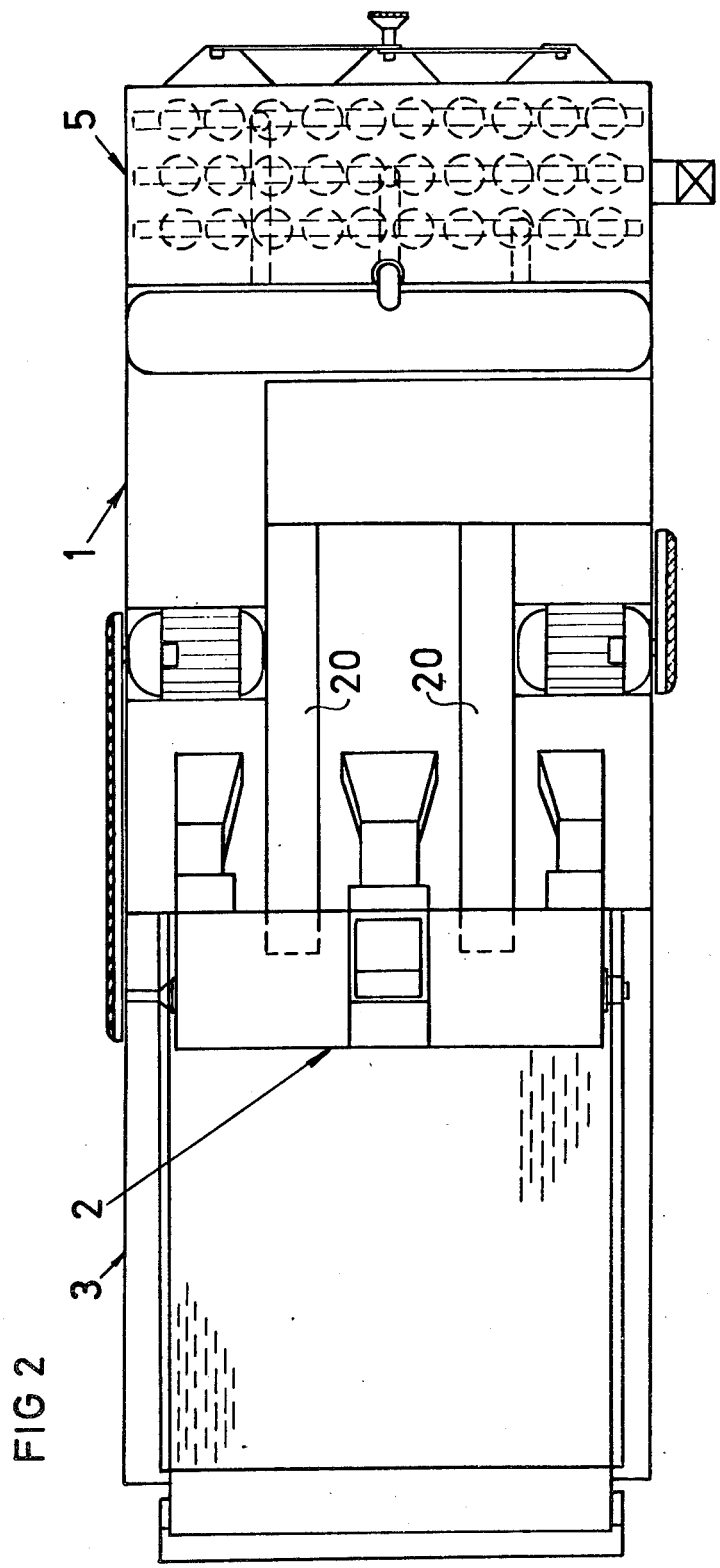
FIG. 2 is a top plan view of the machine of FIG. 1.

The cleaning machine consists of an aspiration chamber 1, a grain intake 2, a screen device 3, a winnower 4 and a filter device 5. Apart from the filter device 5, the cleaning machine according to the present invention corresponds in all its major parts to the cleaning machine described in Swedish Patent Specification No. 192 792. The grain which is to be cleaned is, thus, supplied at the intake 2, where precleaning is effected at 6 and 7, dust and chaff being sucked from the grain. The cleaning station 7 is located adjacent the discharge opening 8 of the machine for the air-cleaned grain, the discharge opening being provided with an outlet sluice. The grain then passes the screen device 3, whose input end is located at the discharge opening 8 at the upper region of the aspiration chamber 1 and whose discharge end is located at the inlet opening 9 at the lower region of the aspiration chamber 1. Between the inlet opening 9 and the discharge sluice 10 in the aspiration chamber 1, the grain once again passes through a cleaning station 11 which is, thus, located adjacent the discharge opening 10 for the air-cleaned grain. From the discharge sluice 10, the grain is passed into the winnower 4 which, however, need not necessarily be used.

As opposed to the case in the cleaning machine described in Swedish Patent Specification No. 192 792, the cleaning process according to the present invention is to be achieved by means of air circulated in enclosed paths by fans, the air being constantly located within the aspiration chamber 1. Because the grain must pass into and out of the aspiration chamber 1, certain air-change cannot be avoided. Thus, air leaks in at the inlet and discharge points for the grain, that is to say, at the discharge sluice 8, the inlet opening 9 and the discharge sluice 10. Furthermore, air enters through the duct 12 from the winnower 4 and from the discharge sluices 13 and 14 from the aspiration chamber.

One of the two fans of the aspiration chamber 1 (both of which are located in separate compartments) has its outlet 15 turned upwardly, the outlet being in communication with a duct 16 for the air recycled to the cleaning station 7. Moreover, the fan cooperates with a duct 17 for the cleaning air moving from the cleaning station 7 to the fan, so as to form an enclosed path. According to the invention, the resistance to the air circulating in the enclosed path is adjusted such that the static O-point will be located in the vicinity of the discharge opening 8 for the air-cleaned grain. As a result, the amount of air which passes through the air sluice at the discharge opening 8 will be reduced to a minimum. This is effected most simply by making the ducts 16 and 17 (which are equally wide) of roughly the same length.

The ducts 16 and 17 for the cleaning air and the recycled air lie in over-and-under relationship, a damper 18 being disposed between the ducts 16 and 17 for directing a portion of the air circulating in a closed path directly between the ducts 16 and 17. The shaft of the damper 18 is located such that the static O-point is not appreciably shifted when the damper 18 is opened or closed. The presence of the damper 18 makes it possible to maintain sufficiently high air speed in the duct 17.

The air which leaks into the aspiration chamber 1 is countered by the air which is discharged from the system. This air is allowed to pass through a dust separation system or a filter device 5. The air which is discharged from the system is screened-off or deflected from the enclosed path ahead of the static O-point. According to the illustrated, preferred embodiment, the fan consists of a centrifugal fan provided with a diffusor 27, the fan being provided, at the periphery of the diffusor 27, with a slot 19, normally called a shave off slot for "shaving off" a portion of the air coming from the fan. Thus, it is this air which is allowed to pass through the filter device 5. Since a certain amount of the air is constantly freed from dust, the air circulating in the system can continuously be maintained at a sufficiently high level of purity.

The air which is sucked in at the material discharge end of the intake 2 or the by-pass at the intake 2, is recycled via a number of conduits 20 connected to the outlet of the upwardly facing fan.

The travel of the air in the above-described system as regards presorting and dust separation is shown by means of a thick broken line with arrows, whereas the travel of the air in the system described below concerning rising air is shown by means of a thick dash-dot line provided with arrows.

The second of the two fans of the aspiration chamber 1 has its outlet 21 facing downwardly, it being in communication with a duct 22 for the air recycled to the cleaning station 11. Moreover, the fan cooperates with a duct 23 for cleaning air moving from the cleaning station 11 to the fan. This duct 23 consists of a rising air duct extending upwardly from the discharge opening 10. Thus, an enclosed path for the air is also formed in this system. The resistance to the air circulating in the enclosed path is adjusted such that the static O-point will be located in the vicinity of the discharge 10 for the air-cleaned grain.

Resistor means is provided at 24 in the duct 22, this resistor means creates an increase in pressure so as to realize uniform air current downstream of the resistor means 24.

In the rising air system, the grain enters at the inlet opening 9 which is not provided with an air sluice. Instead, the lower wall portion 25 is adjustable so as to create a suitable slot through which the grain may pass. In this case, the static O-point is selected so as to realize weak underpressure at the slot. As a result, no dust can pass out at this point. The underpressure may not be too large at the sluice 10 since in such an event it would be difficult for light grain or seed to pass out through the sluice 10. In this case, the O-point may suitably be located at or adjacent the resistor means 24 above the discharge sluice 10.

As in the first system, the fan in the rising air system also consists of a centrifugal fan provided with a diffusor, a shave off-slot 26 being disposed at the periphery of the diffusor for "shaving off" a portion of the air coming from the fan. This air may then pass through the filter device 5 for imparting sufficient level of purity to the air circulating in the rising air system.

The invention should not be considered as restricted to that described above and shown on the drawings, many modifications being possible within the spirit and scope of the appended claims.

Whart we claim and desire to secure by Letters Patent is:

1. A process for cleaning seed or grain comprising the steps of
   circulating air in an enclosed path by a fan means,
   introducing said seed or grain into said enclosed path,
   passing the grain counter to the circulating air adjacent a discharge opening located below where said seed or grain is introduced into said enclosed path,
   establishing a static O-point adjacent said discharge opening during the cleaning process whereby the amount of air which will pass through the discharge opening will be reduced to a minimum to help eliminate dust formation problems while discharging air cleaned grain through said discharge opening.

2. The process of claim 1 further including
   shaving off or deflecting a minor portion of the air from said enclosed path at a point between said fan means and said static O-point,
   and purifying said portion of air.

3. A cleaning machine for carrying out a process of air cleaning of grain comprising
   a fan means,
   an enclosed path,
   said fan means including a fan to circulate air in a predetermined direction in said enclosed path,
   inlet means for introducing grain into said enclosed path,
   a discharge opening in said enclosed path located below said inlet means for discharge of air cleaned grain with the air passing the grain at a position adjacent said discharge opening during the process for air cleaning of grain,
   said enclosed path including
      a first duct connected between said discharge opening and an inlet to said fan,
      and a second duct connected between a discharge of said fan and said discharge opening,
      said ducts being constructed and arranged in a manner so as to control resistance to the air circulating in said enclosed path to locate a static O-point substantially at said discharge opening for air cleaned grain.

4. A cleaning machine as recited in claim 3, wherein said first and second ducts lie in adjacent over-and-under relationship, and further including a damper disposed between said ducts for guiding a portion of the air circulating in said enclosed path directly between said ducts.

5. A cleaning machine as recited in claim 3, wherein said fan is a centrifugal fan provided with a diffusor, said fan being provided, at the periphery of said diffusor, with a slot for shaving off a minor protion of the air coming from said fan.

6. A cleaning machine as recited in claim 5, wherein a filter means is in communication with said slot in said diffusor for cleaning the air shaved off from said enclosed path.

7. A cleaning machine as recited in claim 3, further including
   a second enclosed path,
   said fan means also comprising a second fan for circulating air in a predetermined direction in said second enclosed path,
   a second inlet means for introducing grain into said second enclosed path,
   a second discharge opening in said second enclosed path located below said second inlet means for discharge of air cleaned grain with the air passing the grain adjacent said second discharge opening,
   said second enclosed path including
      a rising air duct in said second enclosed path extending upwardly from said second discharge opening,
   and means to separate and convey grain from said first mentioned discharge opening to said second inlet means.

* * * * *